United States Patent
Neubauer (10) Patent No.: US 12,030,755 B2
(45) Date of Patent: Jul. 9, 2024

(54) METHOD FOR CONTROLLING AND IN PARTICULAR MONITORING AN ACTUATOR, IN PARTICULAR OF A WINCH, A HOIST OR A CRANE, AND SYSTEM FOR CARRYING OUT SUCH A METHOD

(71) Applicant: Konecranes Global Corporation, Hyvinkää (FI)

(72) Inventor: Dirk Neubauer, Wetter (DE)

(73) Assignee: Konecranes Global Corporation, Hyvinkää (FI)

( * ) Notice: Subject to any disclaimer, the term of this patent is extended or adjusted under 35 U.S.C. 154(b) by 945 days.

(21) Appl. No.: 16/978,478

(22) PCT Filed: Mar. 6, 2019

(86) PCT No.: PCT/EP2019/055572
§ 371 (c)(1),
(2) Date: Sep. 4, 2020

(87) PCT Pub. No.: WO2019/170746
PCT Pub. Date: Sep. 12, 2019

(65) Prior Publication Data
US 2021/0047157 A1    Feb. 18, 2021

(30) Foreign Application Priority Data
Mar. 6, 2018    (DE) .......................... 102018105139.5

(51) Int. Cl.
*B66D 1/48* (2006.01)
*B66C 13/22* (2006.01)
(Continued)

(52) U.S. Cl.
CPC .............. *B66D 1/485* (2013.01); *B66C 13/22* (2013.01); *B66C 13/46* (2013.01); *B66C 15/00* (2013.01);
(Continued)

(58) Field of Classification Search
CPC ......... B66D 1/485; B66C 13/22; B66C 13/46; B66C 15/00; B66C 2700/081; B66C 2700/084; H02P 6/12
See application file for complete search history.

(56) References Cited

U.S. PATENT DOCUMENTS 5,954,407 A * 9/1999 Schramm .............. B60T 8/3255
303/155
10,227,011 B2 * 3/2019 Kivelä ................ B60L 15/2009
(Continued)

FOREIGN PATENT DOCUMENTS

DE        19510525 A1    9/1996
DE     102005024358 A1   11/2006
(Continued)

OTHER PUBLICATIONS

Preliminary Report on Patentability of the International Searching Authority in English from corresponding Patent Cooperation Treaty (PCT) Application No. PCT/EP2019/055572, completed Feb. 4, 2020.
(Continued)

*Primary Examiner* — Kyle O Logan
(74) *Attorney, Agent, or Firm* — Gardner, Linn, Burkhart & Ondersma LLP (57) ABSTRACT

A method and system for controlling an actuator, in particular an actuator of a winch, a hoist or a crane, wherein the actuator is controlled using a fail-safe control unit. In order to improve a corresponding method, according to the invention, set point values are calculated in the fail-safe control unit, on the basis of which values the actuator is controlled.

15 Claims, 5 Drawing Sheets

(51) Int. Cl.
*B66C 13/46* (2006.01)
*B66C 15/00* (2006.01)
*H02P 6/12* (2006.01)

(52) U.S. Cl.
CPC .......... *H02P 6/12* (2013.01); *B66C 2700/081* (2013.01); *B66C 2700/084* (2013.01)

(56) References Cited

U.S. PATENT DOCUMENTS

| | | | |
|---|---|---|---|
| 2002/0033481 A1* | 3/2002 | Kemppainen | B66C 13/23 254/275 |
| 2004/0145328 A1* | 7/2004 | Hauf | H02P 3/22 318/372 |
| 2013/0213745 A1* | 8/2013 | Kattainen | B66B 5/0031 187/288 |
| 2016/0152145 A1* | 6/2016 | Kivelä | B60L 7/24 701/19 |
| 2016/0295814 A1* | 10/2016 | Raszga | A01G 23/003 |
| 2019/0010966 A1* | 1/2019 | Bellows | E02F 9/2203 |
| 2020/0283261 A1* | 9/2020 | Calcagno | B66B 5/0031 |

FOREIGN PATENT DOCUMENTS

| | | |
|---|---|---|
| DE | 60131231 T2 | 5/2008 |
| DE | 102012011726 A1 | 12/2013 |
| DE | 102016004350 A1 | 10/2017 |
| EP | 1190980 B1 | 11/2007 |
| EP | 3182139 A1 | 6/2017 |
| WO | 2017089652 A1 | 6/2017 |

OTHER PUBLICATIONS

International Search Report of the International Searching Authority from corresponding Patent Cooperation Treaty (PCT) Application No. PCT/EP2019/055572, indicated completed on May 29, 2019.
Written Opinion of the International Searching Authority from corresponding Patent Cooperation Treaty (PCT) Application No. PCT/EP2019/055572, indicated completed on May 29, 2019.
International Preliminary Examination Report from corresponding Patent Cooperation Treaty (PCT) Application No. PCT/EP2019/055572, transmitted Dec. 20, 2019.
Article entitled "Core Competency Field-Oriented Control" by Peter Kutzaimann, published Mar. 30, 2013.
Industrial Production article entitled "Heavyweight gets fit again" published Nov. 9, 2012.
Demag brochure for Dedrive Pro 880 frequency inverters, published Dec. 15, 2017.

* cited by examiner

METHOD FOR CONTROLLING AND IN PARTICULAR MONITORING AN ACTUATOR, IN PARTICULAR OF A WINCH, A HOIST OR A CRANE, AND SYSTEM FOR CARRYING OUT SUCH A METHOD

CROSS REFERENCE TO RELATED APPLICATION

The present application claims the priority benefits of International Patent Application No. PCT/EP 2019/055572, filed on Mar. 6, 2019, and claims benefit of DE 102018105139.5, filed on Mar. 6, 2018, which are hereby incorporated herein by reference in their entireties.

BACKGROUND AND FIELD OF THE INVENTION

The invention relates to a method for controlling an actuator of a winch, a hoist or a crane, wherein the actuator is controlled via a fail-safe control unit. The invention also relates to a system for carrying out such a method.

Safety functions of winches, hoists and cranes have to meet particular safety standards. Norm specifications for safety functions of cranes or the actuators thereof and the associated control units are found for example in DIN EN ISO 13849, DIN EN 14492-2 and DIN EN 15011. The basic principle behind every safety function of cranes is to reliably achieve a safe state, in which in particular drive axles of the crane are safely stopped. For this purpose, the control unit must ensure that the driving actuator of the respective drive axle is shut off, and that subsequently the actuator of a holding brake serves to hold the position of the drive axle by means of mechanical braking force of the holding brake. For this purpose, in accordance with the aforementioned norms, safety levels which are defined by so-called control categories and performance levels are to be met. Control categories relate to the structure of the respective control unit and stipulate a redundant structure, such as in the case of control category 3. The redundant structure is to ensure that a fault does not lead to the loss of the respective safety function. Accordingly, for instance two separate pre-end switches or two separate end switches are to be provided for actuators of crane drive axles. Performance levels relate to the quality of the components of the control unit. In this regard, the present invention relates to so-called fail-safe control units, which meet at least the requirements in accordance with control category 3 and performance level d.

A safety function is for example a safe speed reduction as a pre-end switch is reached. In this regard, in the case of known cranes, driving actuators that are for example part of frequency converter-controlled drive motors are controlled and monitored via a fail-safe control unit. In this case, in the frequency converter and therefore outside the fail-safe control unit, ramp-shaped desired speed progressions are calculated as desired values for movements of the crane and the actuator or drive motor is controlled on the basis thereof. The monitoring of the actuator, performed by the fail-safe control unit, or its implementation of the desired values is effected in this case in a static manner, in that actual values are determined by a two-channel sensor system and are compared to fixedly specified thresholds in the fail-safe control unit. In order to satisfy at least the requirements in accordance with control category 3 and performance level d, reliable actual values must be available to the fail-safe control unit for reliable monitoring of the actuator because, in terms of the above norm, the desired value calculation in the frequency converter is considered to be unreliable. In order, in this sense, to reliably determine actual values in the form of actual speeds, the sensor system in the case of such known crane installations comprises two hardware channels, each having a speed sensor or special-purpose sensor and corresponding evaluation unit with a pulse counter in the form of a so-called counter card. Each hardware channel can have an absolute value measuring system instead of a speed sensor or encoder and pulse counter. The absolute value measuring system used can be for example a laser sensor for absolute distance and position measurement in conjunction with a so-called analogue value card. In this case, each hardware channel serves, in each case separately, to determine and feedback corresponding actual values to the fail-safe control unit.

SUMMARY OF THE INVENTION

It is an object of the present invention is to provide an improved method for controlling an actuator and an improved system for carrying out such a method which in each case are configured in a particularly simple manner and are reliable.

In accordance with the invention, a method for controlling an actuator, in particular an actuator of a winch, a hoist or a crane, wherein the actuator is controlled via a fail-safe control unit, is improved by virtue of the fact that in the fail-safe control unit, desired values are calculated, on the basis of which the actuator is controlled.

In this case, the fail-safe control unit used is preferably a so-called programmable logic controller which is also defined as a SPS or PLC. The desired values calculated as a reference variable in the fail-safe control unit, in particular by means of a ramp generator or position ramp function generator, can be in this regard desired speeds, in particular in the form of ramp-shaped desired speed progressions and/or relative or absolute desired positions, which can be achieved via the actuator, in that the actuator effects corresponding movements of movable parts of a winch, a hoist or a crane in the possible movement directions, which are then performed in particular at the ramp-shaped speeds.

The desired values relate accordingly to horizontal movements of a crane in the X-direction and Y-direction and its vertical movements in the Z-direction. The X-, Y- and Z-directions relate in this case to a Cartesian coordinate system. In the case of an overhead travelling crane, the horizontal X-Y-movements can be in particular movements of a crane girder which are effected typically at a right angle to the horizontal longitudinal extension of the crane girder, or of a crane trolley travelling in the direction of the longitudinal extension along the crane girder. The vertical Z-movements are in particular lifting or lowering movements of the load picking-up means of a lifting mechanism arranged on the crane trolley, including the load possibly fastened to the load picking-up means. In the case of a winch having a positionally fixed traction apparatus or in the case of a hoist having a positionally fixed lifting mechanism, the movements are correspondingly one-dimensional traction movements in the respective direction of action of the winch or the hoist. Therefore, the control and in particular monitoring of actuators considered within the scope of the present invention relates in particular to the driving actuators of the respective drives or drive motors and associated drive axles which a winch, a hoist or a crane has in order to be able to carry out corresponding movements in terms of the calculated desired values. This also includes actuators of a possibly provided rotating mechanism or luffing mechanism of a crane. In this case, the drive motors are designed typically as electric motors, wherein they can either be of the type of frequency converter-controlled electric motors or of the type of pole-changing and in particular line-commutated electric motors.

If, in the case of pole-changing and in particular line-commutated electric motors, the driving actuators are controlled via switches in the form of switch contactors, the desired values calculated for this purpose in the fail-safe control unit can also be desired positions for the switches or switch contactors. In this case, the desired positions can correspond to a slow and a fast speed and/or mutually opposite movement directions.

Furthermore, the method in accordance with the invention can be stored in a fail-safe control unit in an advantageous manner irrespective of the peripherals present, i.e. independently of the type of the electric motor present. This permits retrofitting of existing crane installations which is particularly cost-effective and increases safety. New installations can also be set up from the outset with a corresponding level of safety.

In an advantageous manner, provision is also made that the actuator is monitored by means of the fail-safe control unit and, in order to monitor the respective actuator in the fail-safe control unit the desired values, on the basis of which the actuator is controlled, are compared to actual values which are determined via a sensor system. In this case, the calculation of said desired values that is effected, in accordance with the invention, in the fail-safe control unit advantageously ensures that the fail-safe control unit, as part of the procedure of monitoring actuators, can take into consideration expectations, which are based on the reliably calculated desired values and are thus "trustworthy".

In this regard, according to one embodiment, provision is also made that actual values are fed back to the fail-safe control unit via a single hardware channel of the sensor system, which connects the actuator to the fail-safe control unit and also has only a single position measuring sensor such as in the form of an encoder or an absolute value measuring system in the above sense. Instead of a position measuring sensor, a speed sensor can also be used.

In this case, the actual values, which are determined by the respective sensor as a feedback variable and are made available to the fail-safe control unit for monitoring purposes, are preferably actual positions and/or actual speeds or actual speed progressions. In turn, the determined actual positions can be relative or absolute positions depending upon the type of position measuring sensor. In the case of a position measuring sensor designed as an encoder, in particular an incremental encoder or special-purpose sensor, the relative positions relate to the beginning of counting of the encoder pulses or the associated evaluation unit of the sensor system, by means of which the encoder pulses are detected. The relative actual positions can be calculated for example in the fail-safe control unit from the pulses or incremental values of the corresponding encoder which are fed back in the form of signals and represent the actual values. Alternatively, the position measuring sensor can also be an absolute value measuring system, which provides absolute actual positions. For this purpose, it is feasible for example to use a laser sensor, also defined as an absolute value laser, for absolute distance and position measurement, which operates for example according to the principle of time of flight measurement. Instead of a pulse counter in the form of a counter card, the evaluation unit of the sensor system can then have a so-called analogue value card or can be integrated as a bus connection in the sensor. For a comparison to desired speeds or desired speed progressions, actual speeds can be calculated from changes in the determined actual positions. For this purpose, data required for the calculation, such as for example transmission factors, wheel diameters of running gear units, drum diameters of cable drums or information relating to any possible reeving arrangement are stored in the fail-safe control unit and can be retrieved for the calculation. This data can be used by the fail-safe control unit also for the aforementioned calculation of relative actual positions from pulses or incremental values of the encoder.

In other words, a safety level in accordance with control category 3 and performance level d can thus still be achieved with only one single hardware channel for feeding back actual values, although, by reason of the missing second hardware channel, the actual values are "unreliable" in terms of the aforementioned norm. This is possible by virtue of the fact that, as part of the monitoring procedure, the "unreliable" actual values are compared to desired values calculated "reliably" in the fail-safe control unit. In this case, the two-channel aspect of the sensor system in terms of the norm, to be fulfilled in accordance with control category 3 and performance level d, is provided by virtue of the fact that, in addition to the single hardware channel for determining and feeding back actual values, the desired value calculation in the fail-safe control unit serves as a second channel of the sensor system. In accordance with the invention, the second channel of the sensor system is thus a pure software channel within the fail-safe control unit and so, in contrast to the prior art, a second hardware channel for determining and feeding back actual values and the associated components, such as for example incremental encoders or absolute value measuring apparatuses and associated evaluation units, can be omitted. As a result, the hardware outlay required for such a method for controlling and monitoring an actuator and the component costs associated therewith can be reduced significantly in an advantageous manner. In contrast thereto, in the case of the known cranes, two hardware channels are required for separately determining and feeding back actual values because in that case by reason of the "unreliable" desired value calculation outside the fail-safe control unit in the frequency converter the fail-safe control unit does not expect any speeds or positions but instead can take into consideration and process merely measured actual values as part of the monitoring procedure.

In an advantageous manner, provision is also made that the calculation of the desired values, the determination of the actual values and the comparison of the desired values to the actual vales are each performed cyclically, preferably in a cycle of 10 ms to 100 ms, particularly preferably in a cycle of 20 ms to 50 ms. As a result, the control and in particular the monitoring of the respective actuator is not effected statically and not on the basis of fixedly specified thresholds but instead is effected dynamically and continuously.

Reliable speed or position monitoring can also be achieved by virtue of the fact that a settable time interval of a timing element is started and the set time interval is waited if the actual values leave a tolerance range specified relatively to the desired values, and the monitored actuator is shut off if the actual values are outside the tolerance range even after the time interval has elapsed. In this case, the tolerance range corresponds to hysteresis around the respective desired values. If, within the set time interval, the actual values are then within the tolerance range, the monitored actuator is not shut off. As said values leave the tolerance range once again, the time interval is restarted.

Alternatively or in addition, the desired values calculated in the fail-safe control unit can also be desired positions for a holding brake of a winch, a hoist or a crane, in particular a closed position and an open position of the holding brake. They can also be desired positions for an end switch, in particular a pre-end switch, such as of a travel drive of the trolley running gear unit axle of a crane. Accordingly, the actuator that is controlled and monitored in accordance with the invention can be not only part of a drive motor, in the above sense as a driving actuator, but can also be, as an actuating element, part of a holding brake or an end switch or pre-end switch. In the case of a holding brake, the actuating element can be e.g. a braking contactor of the holding brake. For this purpose, a suitable sensor system is then provided in order to determine actual positions of the actuating element of the holding brake or the end switch/pre-end switch.

In particular, if a drive axle, such as a trolley running gear unit axle, is provided with a single position measuring sensor designed as an absolute value measuring apparatus, then movement of the drive axle or of the corresponding driving actuator without an end switch is possible and so end switches can be dispensed with. For this purpose, as previously described, the absolute actual position that is determined by the sensor system and communicated via the single hardware channel as a feedback variable is used in order to monitor the implementation of the desired values in the fail-safe control unit, which values have been calculated for example as a ramp-shaped desired speed progression and, until the end position is reached, provide a speed reduction until a standstill position is reached. In this case, the end positions in the desired speed progression are then taken into consideration. This method is particularly advantageous when, for example by reason of a lack of space, two position measuring sensors cannot be provided. In this case, it is also possible to advantageously reduce component costs.

A further safety function can be advantageously achieved in that the controlled and in particular monitored actuator is a driving actuator and a second actuator is controlled and monitored, the second actuator is designed as an actuating element of a holding brake, in order to control and monitor the second actuator in dependence upon the desired values calculated for the driving actuator a settable time interval of a timing element is started and the set time interval is waited and the driving actuator is shut off if an actual position of the second actuator determined in particular by the corresponding sensor system does not correspond to a desired position of the second actuator even after the time interval has elapsed. In this case, the driving actuator is for example part of a lifting mechanism or the associated driving axle.

The previously described method can be used to recognise a defect in the actuating element even when the drive axle is at a standstill and not only when a load falls.

Furthermore, provision can be made that the controlled and in particular monitored actuator is a driving actuator and in addition via the fail-safe control unit an end switch is monitored in dependence upon the desired values calculated for the driving actuator and in particular the driving actuator is slowed down or shut off if an actual position of the monitored end switch, as determined in particular by the corresponding sensor system, does not correspond to a desired position of the end switch as a desired value of the driving actuator is achieved. During the monitoring of two end switches, their response is not monitored by a time comparison by means of a timing element but instead on the basis of a position calculation. In this case, a distance can then be set as a desired value and a check can be made as to whether, starting from the response of the first end switch as or after the desired value is achieved, the second end switch has also responded. If not, the driving actuator is correspondingly slowed down or shut off. In this case, as already mentioned above, the respective end switch can also be a pre-end switch and so initially only braking for reducing or slowing down speed is effected and the corresponding actuator is not yet completely shut off or stopped.

Both as part of the procedure of monitoring the described method without an end switch and also as part of the procedure of monitoring the actuating element of the holding brake or the end switch, the fail-safe control unit thus takes into consideration expectations which are based upon the reliably calculated desired values and are thus "trustworthy". Then, on the basis of the expectations, the response of the respective actuator or end switch to the specified desired value or the specified desired position is then checked in terms of fault recognition.

In particular, by reason of the "trustworthiness" of the reliably calculated desired values, it is also possible in an alternative embodiment to dispense with any feedback of actual values to the fail-safe control unit and thus to dispense with monitoring in the conventional sense. Instead, so-called encoder-less monitoring takes place, in which accordingly a hardware channel for providing feedback is no longer required. For this purpose, in the case of driving actuators that are part of a frequency converter-controlled electric motor, suitable parameterisation of the converter is to be performed. The parameterisation is then effected in such a way that a manipulation of the actual values is deliberately effected in the converter and is then transmitted via a communications interface or control line for signal transmission to the fail-safe control unit. The fail-safe control unit knows the specified manipulation method of the converter and corrects the manipulation for its monitoring. In the case of driving actuators that are part of a pole-changing and in particular line-commutated electric motor, it is likewise the case—as was also the case previously—that no corresponding feedback is provided.

A system for controlling and in particular monitoring an actuator, in particular an actuator of a winch, a hoist or a crane, and a fail-safe control unit, wherein the actuator can be controlled and in particular monitored via the fail-safe control unit, can be improved by virtue of the fact that the system is designed and configured to carry out a method in accordance with the invention in particular in the above-described sense. The advantages achieved with regard to the method apply analogously to such a system.

The invention will be described in greater detail with reference to the following figures.

DESCRIPTION OF THE PREFERRED EMBODIMENTS

Figure 1:
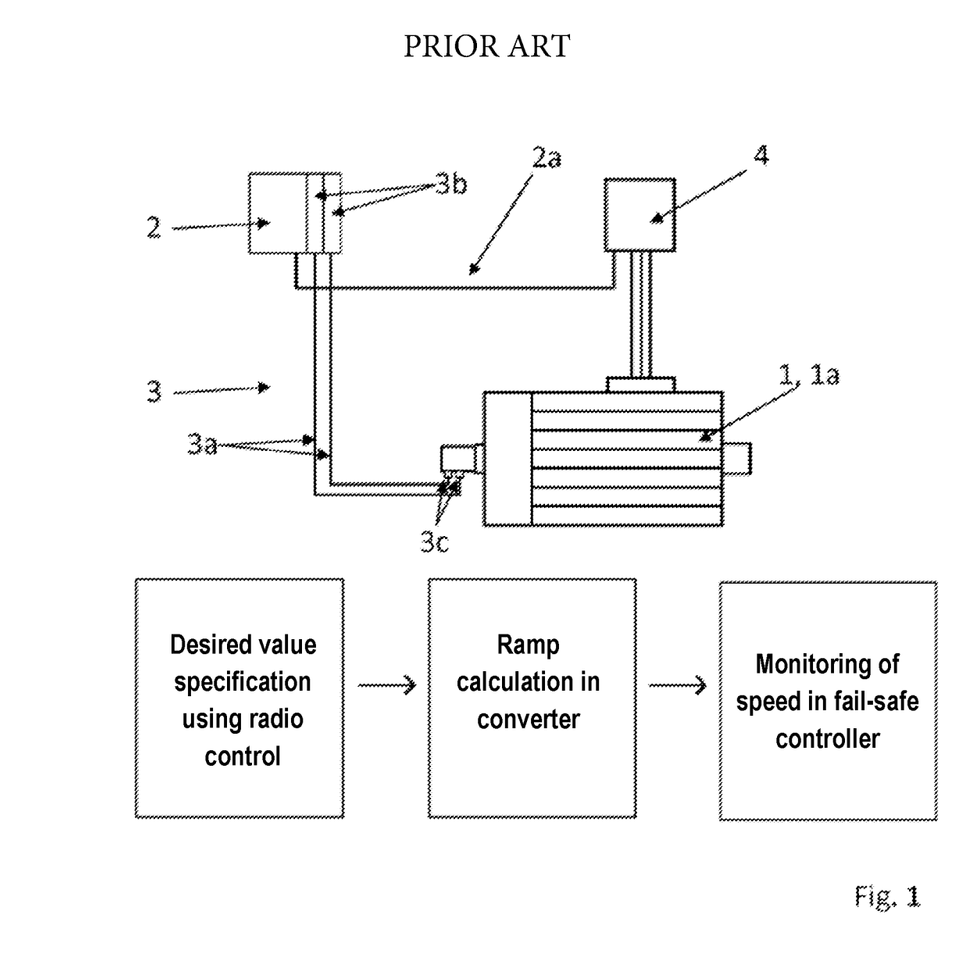
FIG. 1 shows a system for controlling and monitoring a driving actuator in accordance with the prior art.

FIG. 1 shows a system for controlling and monitoring a driving actuator 1 in accordance with the prior art already described in the introduction. In this case, the actuator 1 is part of an electric motor 1a which is designed by way of example as a frequency converter-controlled electric motor and can be a drive motor of a winch, a hoist or a crane. An operating part (not illustrated) which is also defined as a control point and can be for example a radio remote control or radio controller can be used to control the actuator 1, in that, by means of actuating an operating element of the operating part, control commands can be specified for the actuator 1. The control commands can be for example "movement at maximum speed in the forwards direction" or "movement at a speed of 1 m/min in the rearwards direction". Starting from the operating part, signals corresponding to the respective control command are transmitted from a fail-safe control unit 2 via a control line 2a to a converter 4, which is designed as a frequency converter and serves to actually control the actuator 1. In the converter 4, the specified control commands are used for calculating desired values in the form of a ramp-shaped desired speed progression. This is also defined as a ramp calculation. The actuator 1 is then controlled by means of the desired values calculated in the converter 4.

The monitoring of the actuator 1, i.e. its actual implementation of the desired values, is effected, as already described above, in a static manner by the fail-safe control unit 2, in that a two-channel sensor system 3 determines actual values, which are compared in the fail-safe control unit 2 to fixedly specified thresholds. For this purpose, the sensor system 3 comprises two hardware channels 3a each having a speed sensor 3c or special-purpose sensor, allocated to the actuator 1, and a corresponding evaluation unit 3b each having a pulse counter in the form of a so-called counter card. The actual values are transmitted via the hardware channels 3a to the associated evaluation units 3b and are transmitted from the evaluation units 3b to the fail-safe control unit 2 so that the actual values can be compared there to the specified thresholds.

Figure 2:
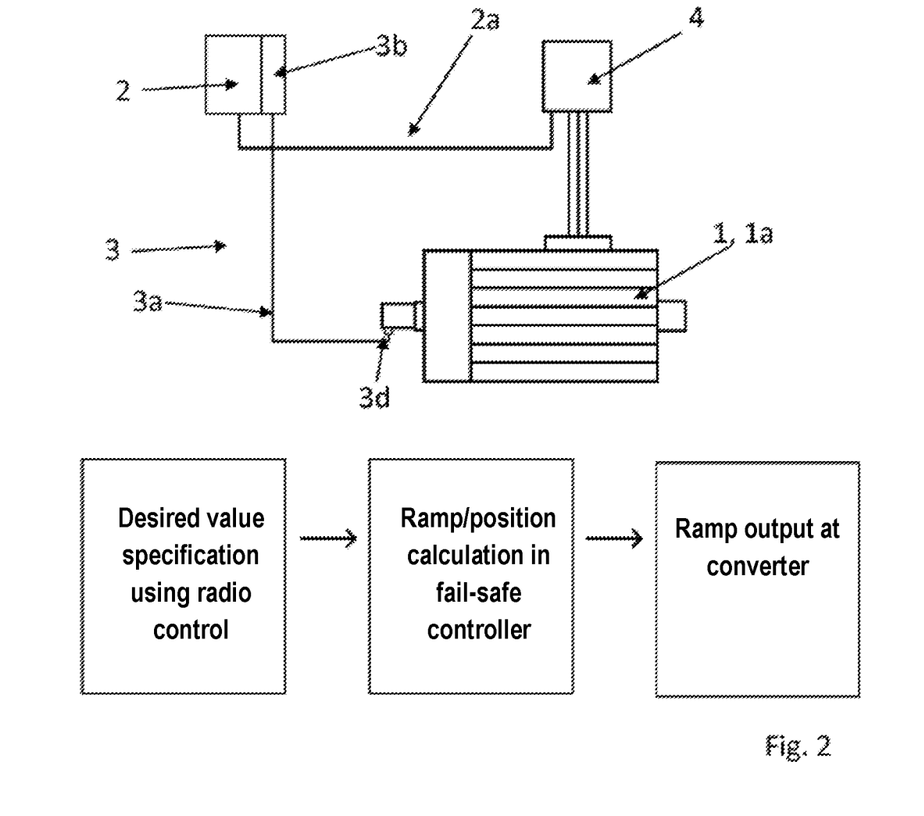
FIG. 2 shows a system, in accordance with the invention, for controlling and monitoring the driving actuator of FIG. 1.

In contrast thereto, FIG. 2 shows a system in accordance with the invention for controlling and monitoring the driving actuator 1 of FIG. 1. The system in accordance with the invention shown in FIG. 2 differs from that shown in FIG. 1 by virtue of the fact that the sensor system 3 has only one single hardware channel 3a and one position measuring sensor 3d. The position measuring sensor 3d can be a simple incremental encoder for determining relative actual positions or can even be an absolute value measuring system for determining absolute actual positions. Instead of the position measuring sensor 3d, a speed sensor 3c can also be used. The second hardware channel 3a provided in the prior art shown in FIG. 1 and the associated components (sensor or encoder and evaluation unit) are replaced in accordance with the invention by an aforementioned software channel within the fail-safe control unit 2. In this regard, provision is made that the ramp calculation is no longer effected, as in the prior art, within the converter 4 but instead is effected within the fail-safe control unit 2 itself. This is followed by a transmission, also defined as a ramp output, of the ramp-shaped desired speed progression, which is calculated with the aid of the control commands, to the converter 4 so that the converter can hereby control the actuator 1.

The basis of the system illustrated schematically in FIG. 2 is a so-called secure ramp generator which is part of the fail-safe control unit 2 and produces in accordance with settable parameters the ramp-shaped desired speed progression, also defined as a speed ramp.

Figure 3:
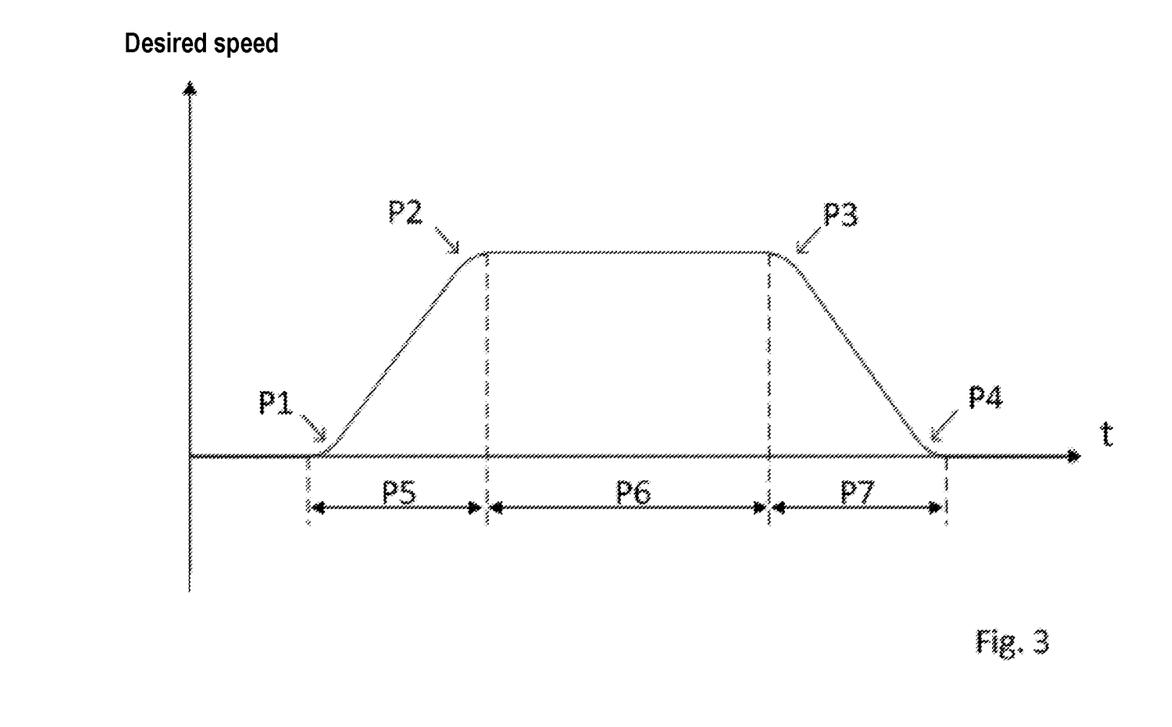
FIG. 3 shows a schematic view of desired values, calculated by means of the fail-safe control unit, in the form of a speed ramp.

FIG. 3 shows a schematic view of desired values, calculated by means of the fail-safe control unit 2, in the form of the speed ramp. The speed ramp is to be set with the parameters P1 "start acceleration rounding", P2 "end acceleration rounding", P3 "start deceleration rounding", P4 "end deceleration rounding", P5 "acceleration" and P7 "deceleration". The desired value for the ramp, i.e. for its range P6 "persistence", is generated by the control point as part of the control command and is limited by the ramp generator with reliable values. The reliable values can be specified by a pre-end switch and so, as this is being reached, for example a limitation to 25% of the maximum possible speed vmax is effected, even if the control command is 50% of vmax. Even in the event of an overload recognised by means of a load sensor, the lifting speed can be limited as a reliable value to zero. Starting from the desired value for the ramp, the reliable ramp generator generates for example desired speeds between −1000 and +1000 per mill, wherein speeds with a minus sign are directed oppositely to those with a plus sign. A speed which has a value of 1000 per mill corresponds in this case to the maximum possible speed vmax and a speed which has a value of 1 per mill corresponds to the minimum possible speed vmin. In other words, the ramp generator can thus generate speed ramps with a scaling of 1000 and corresponding resolution.

The initial value of the reliable ramp generator is transmitted to a so-called reliable position ramp function generator which, just like the ramp generator, is part of the fail-safe control unit 2 and serves to calculate a relative and/or absolute position, such as of an axle of the crane running gear unit or trolley running gear unit driven by the actuator 1. For this purpose, a distance per program cycle of the safety program stored in the fail-safe control unit 2 is calculated and added up by the position ramp function generator.

Example: Actuator of the crane running gear unit

Speed vmax: 63 m/min

Scanning rate of safety program tFZ, ("FZ"=fail-safe cycle"): 50 ms

Constant travel vmax results in the following distance sFZ vmax per scanning rate in the safety program:

$$s_{FZVmax} = \frac{V^*1000}{60} : \frac{1000}{t_{FZ}} = \frac{63 \text{ m/min} * 1000}{60} : \frac{1000}{50 \text{ ms}} = 52 \text{ mm}$$

Since the speed ramp is resolved to a scaling of 1000, at 1 per mill speed vmin the following minimum distance sFZ vmin is achieved per scanning rate in the safety program:

$$s_{FZVmin} = \frac{s_{FZVmax}}{1000} = \frac{52 \text{ mm}}{1000} = 0{,}052 \text{ mm}$$

The reliable position ramp function generator calculates the distance travelled depending upon the desired value of the reliable ramp generator multiplied by the minimum distance per scanning rate sFZ vmin and the ramp scaling.

Figure 4:
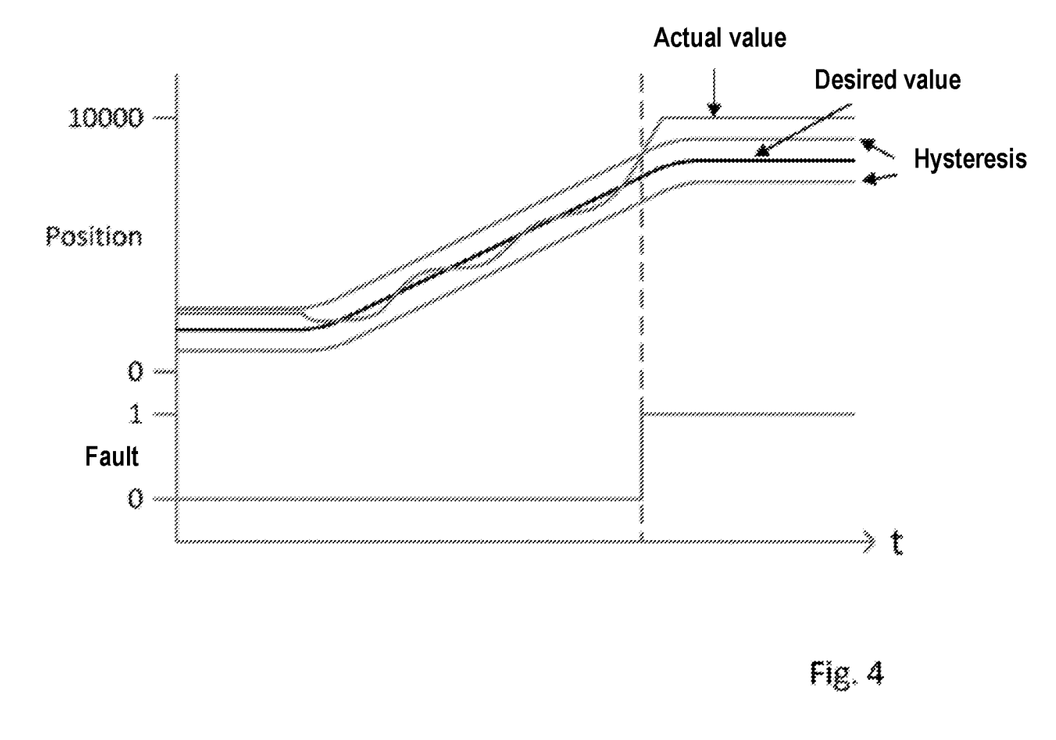
FIG. 4 shows a schematic view of the position monitoring of an actuator effected by means of the fail-safe control unit.

FIG. 4 shows a schematic view of the position monitoring of the actuator 1 effected by means of the fail-safe control unit 2. The position monitoring can thus be used for recognising faults in relation to the driving actuator 1. The position monitoring is performed with a comparison module of the fail-safe control unit 2. The comparison module is connected to both channels of the sensor system 3, i.e. connected to the software channel and the single hardware channel 3a. The desired value, i.e. a corresponding relative or absolute desired position, which is calculated by the reliable position ramp function generator provided in the safety part of the fail-safe control unit 2 is specified as a reference variable to the comparison module via the software channel. The actual value, i.e. a corresponding relative or absolute actual position or a signal corresponding to the actual value, which is determined by the position measuring sensor 3d is communicated as a feedback variable via the hardware channel 3a. This can be an incremental value that is made available to the fail-safe control unit 2. In the fail-safe control unit 2, the incremental value is then converted into an actual position in particular on the basis of the resolution, the transmission factor and the wheel/drum diameter with a possible reeving arrangement.

The reference variable (desired position) is then compared to the feedback variable (actual position) in each program cycle of the safety program. The respective positions are illustrated in FIG. 4, wherein by way of example a position value range of 0 to 10000 is shown on the Y-axis. If the deviation in the desired and actual positions is within a settable hysteresis, the position is graded as "OK". Therefore, there is no fault in relation to the monitored actuator 1, which in FIG. 4 corresponds to the fault value "0". If the feedback variable leaves the hysteresis, a timing element is started. After a settable time has elapsed, the position would be considered to be "not OK" and therefore would be considered as a fault in the monitored actuator 1 and the monitored actuator is shut off or at least stopped. This corresponds in FIG. 4 to the fault value "1". Should the feedback variable then be within the hysteresis during the set time, the fault value then changes to "0" without the actuator 1 being shut off. Upon leaving the hysteresis once again, the timing element or the set time then starts anew. The hysteresis is configured in a fail-safe data module within the fail-safe control unit 2. Position regulation in the standard program of the fail-safe control unit 2 ensures that the desired position of the actuator 1 or of the axle drive by the actuator 1 is maintained.

In this case, the actuator 1 does not have to be part of a frequency converter-controlled electric motor 1a but instead can also be part of a pole-changing and in particular line-commutated electric motor 1a.

The described position monitoring of the driving actuator 1 can also be used for monitoring and thus for recognising faults in relation to a second actuator, wherein the second actuator can be designed as an actuating element of a holding brake or as an end switch, in particular a pre-end switch. In the case of the monitoring of an end switch/pre-end switch, the driving actuator 1 as part of the corresponding electric motor 1a is slowed down or shut off if an actual position of the monitored end switch/pre-end switch does not correspond to a desired position of the end switch as a specified desired value of the driving actuator 1 is achieved. In this case, it is also possible to monitor two end switches in the manner described above by specifying a corresponding distance as a desired value.

Figure 5:
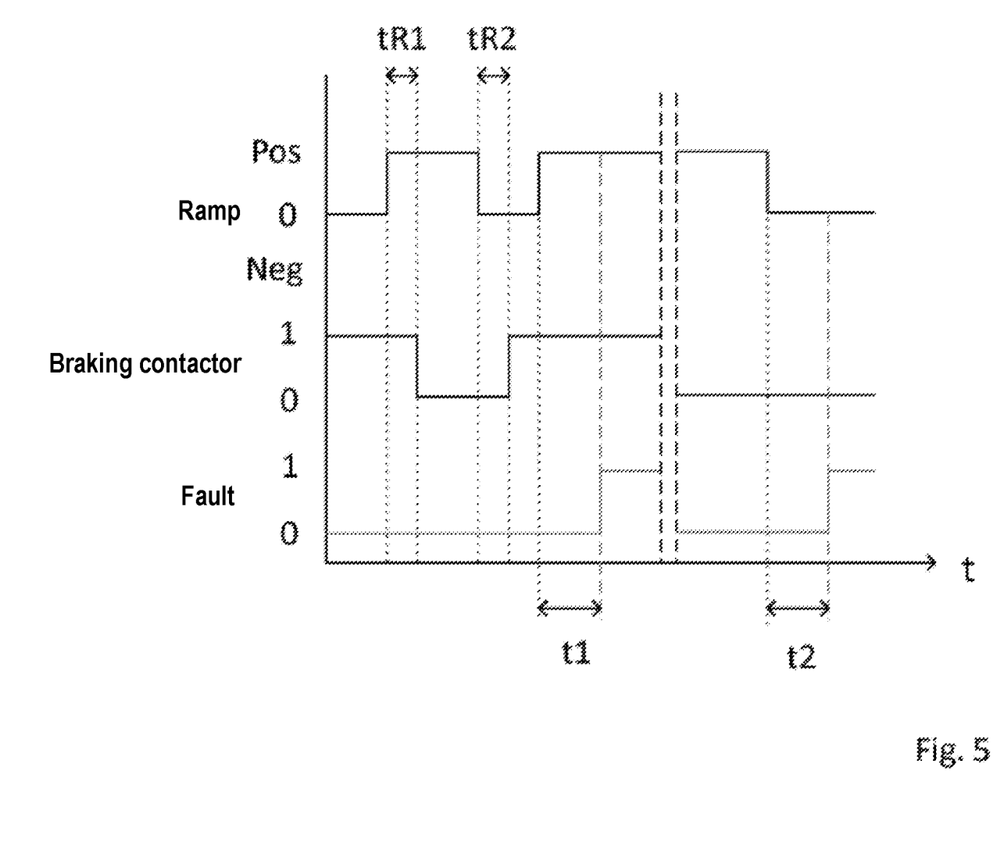
FIG. 5 shows a schematic view of the braking contactor monitoring effected by means of the fail-safe control unit.

In the case of the monitoring of a holding brake, the driving actuator 1 is shut off if an actual position of the second actuator does not correspond to a desired position of the second actuator even after a settable time interval of the timing element has elapsed. If the second actuator which is designed as an actuating element of a holding brake is a braking contactor, braking contactor monitoring is thus effected in this manner FIG. 5 shows a schematic view of the braking contactor monitoring effected by means of the fail-safe control unit 2. Possible actual or desired positions of the braking contactor are "not dropped out" or "0" for an open brake or "dropped out" or "1" for a closed brake.

If the actuator 1 is to perform a movement starting from a standstill, the associated ramp desired value is limited by the ramp generator to a parameterisable value in order to give the converter 4 time to open the brake via the braking contactor. At the same time, a timing element is started which monitors that the braking contactor changes its position to "not dropped out" within a parameterisable time interval t1. The time interval t1 corresponds at least to the reaction time tR1 of the braking contactor, wherein both t1 and tR1 relate to the corresponding change in the ramp desired value. If the position is changed to "not dropped out" at the end of the reaction time tR1 and thus within t1, this corresponds in FIG. 5 to the fault value "0". For reasons of improved clarity, only tR1, and not t1, is illustrated for the fault value "0". If the time interval t1 which is also defined as the monitoring time is exceeded without the position changing to "not dropped out", this is recognised as a defective braking contactor or as a defect in the rotational speed adjuster. This corresponds in FIG. 5 to the fault value "1".

The same applies if, upon completion of the movement of the driving actuator 1, the ramp desired value then reaches "0". At the same time, a timing element is then started which monitors that the braking contactor changes its position to "dropped out" within a parameterisable time interval t2. If the position is changed to "dropped out" at the end of the reaction time tR2 and thus within t2, this corresponds in FIG. 5 to the fault value "0". For reasons of improved clarity, only tR2, and not t2, is illustrated for the fault value "0". If the corresponding time interval t2 is exceeded, without the position changing to "dropped out", this is also recognised in this case as a defective braking contactor or as a defect in the rotational speed adjuster. This corresponds in FIG. 5 to the fault value "1". The time interval t2 also corresponds at least to the reaction time tR2 of the braking contactor, wherein both t2 and tR2 relate to the corresponding change in the ramp desired value. The length of the time intervals t1 and t2 can be the same or different.

The invention claimed is:

1. A method for controlling an actuator of a winch, a hoist or a crane via a fail-safe control unit, wherein said method comprises:
   calculating desired values for the position or speed of the actuator in the fail-safe control unit based on which the actuator is controlled;
   determining actual values of the position or speed of the actuator using a single position measuring sensor or a single speed sensor;
   monitoring the actuator via the fail-safe control unit by comparing the desired values to the actual values; and
   providing a single hardware channel connecting the actuator to the fail-safe control unit and providing the actual values from the single position measuring sensor or the single speed sensor back to the fail-safe control unit via the single hardware channel.

2. The method as claimed in claim 1, wherein said calculating the desired values, determining the actual values, and comparing the desired values to the actual values are each performed cyclically.

3. The method as claimed in claim 2, wherein a tolerance range is specified relative to the desired values, and wherein a settable time interval of a timer is started and is awaited if the actual values go outside the tolerance range, and wherein the monitored actuator is shut off if the actual values are outside the tolerance range even after the time interval has elapsed.

4. The method as claimed in claim 2, wherein the controlled and monitored actuator is a driving actuator, and wherein a second actuator is controlled and monitored via the fail-safe control unit with the second actuator configured as an actuating element of a holding brake, and wherein in order to control and monitor the second actuator in dependence upon the desired values calculated for the driving actuator a settable time interval of a timer is started and is waited, and wherein the driving actuator is shut off if an actual position of the second actuator does not correspond to a desired position of the second actuator even after the time interval has elapsed.

5. The method as claimed in claim 2, wherein the controlled and monitored actuator is a driving actuator, and wherein via the fail-safe control unit an end switch is monitored in dependence upon the desired values calculated for the driving actuator, wherein the driving actuator is slowed down or shut off if an actual position of the monitored end switch does not correspond to a desired position of the end switch as a desired value of the driving actuator is achieved.

6. The method as claimed in claim 1, wherein the controlled and monitored actuator is part of an electric motor that serves as a drive motor for a winch, a hoist, or a crane, and wherein the electric motor comprises a frequency converter-controlled electric motor, a pole-changing electric motor, or a line-commutated electric motor.

7. The method as claimed in claim 1, wherein a tolerance range is specified relative to the desired values, and wherein a settable time interval of a timer is started and is awaited if the actual values go outside the tolerance range, and wherein the monitored actuator is shut off if the actual values are outside the tolerance range even after the time interval has elapsed.

8. The method as claimed in claim 1, wherein the controlled and monitored actuator is a driving actuator, and wherein a second actuator is controlled and monitored via the fail-safe control unit with the second actuator configured as an actuating element of a holding brake, and wherein in order to control and monitor the second actuator in dependence upon the desired values calculated for the driving actuator a settable time interval of a timer is started and is waited, and wherein the driving actuator is shut off if an actual position of the second actuator does not correspond to a desired position of the second actuator even after the time interval has elapsed.

9. The method as claimed in claim 1, wherein the controlled and monitored actuator is a driving actuator, and wherein via the fail-safe control unit an end switch is monitored in dependence upon the desired values calculated for the driving actuator, wherein the driving actuator is slowed down or shut off if an actual position of the monitored end switch does not correspond to a desired position of the end switch as a desired value of the driving actuator is achieved.

10. A method for controlling an actuator of a winch, a hoist or a crane via a fail-safe control unit, wherein said method comprises:
    calculating desired values for the position or speed of the actuator in the fail-safe control unit based on which the actuator is controlled;
    determining actual values of the position or speed of the actuator using a single position measuring sensor or a single speed sensor; and
    monitoring the actuator via the fail-safe control unit by encoder-less monitoring.

11. The method as claimed in claim 10, wherein a tolerance range is specified relative to the desired values, and wherein a settable time interval of a timer is started and is awaited if the actual values go outside the tolerance range, and wherein the monitored actuator is shut off if the actual values are outside the tolerance range even after the time interval has elapsed.

12. The method as claimed in claim 10, wherein the controlled and monitored actuator is a driving actuator, and wherein a second actuator is controlled and monitored via the fail-safe control unit with the second actuator configured as an actuating element of a holding brake, and wherein in order to control and monitor the second actuator in dependence upon the desired values calculated for the driving actuator a settable time interval of a timer is started and is waited, and wherein the driving actuator is shut off if an actual position of the second actuator does not correspond to a desired position of the second actuator even after the time interval has elapsed.

13. The method as claimed in claim 10, wherein the controlled and monitored actuator is a driving actuator, and wherein via the fail-safe control unit an end switch is monitored in dependence upon the desired values calculated for the driving actuator, wherein the driving actuator is slowed down or shut off if an actual position of the monitored end switch does not correspond to a desired position of the end switch as a desired value of the driving actuator is achieved.

14. The method as claimed in claim 10, wherein the controlled and monitored actuator is part of an electric motor that serves as a drive motor for a winch, a hoist, or a crane, and wherein the electric motor comprises a frequency converter-controlled electric motor, a pole-changing electric motor, or a line-commutated electric motor.

15. A system for controlling and monitoring an actuator of a winch, a hoist or a crane, said system comprising:
    an actuator; and
    a fail-safe control unit;
    wherein the actuator can be controlled and monitored via the fail-safe control unit according to the method of claim 1.

* * * * *